Jan. 29, 1924.

G. A. LYON

AUTOMOBILE BUFFER DEVICE

Filed March 27, 1922

1,481,967

INVENTOR.
George Albert Lyon
BY
Harry L. Duncan
ATTORNEY.

Patented Jan. 29, 1924.

1,481,967

UNITED STATES PATENT OFFICE.

GEORGE ALBERT LYON, OF PHILADELPHIA, PENNSYLVANIA.

AUTOMOBILE BUFFER DEVICE.

Application filed March 27, 1922. Serial No. 547,323.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffer Devices, of which the following is a specification, taken in connection with the accompanying drawing.

The invention in this case, which is a continuation in part of my copending applications Serial No. 477,586 filed June 14, 1921, and Serial No. 517,268, filed November 23, 1921, relates especially to resilient buffer or bumper devices for automobiles or other vehicles in which the spring steel or other resilient strips or members have clamped thereto a resilient sheet metal or other contact clamping or connecting device having a vertically wide contact face throughout the central part of the buffer and having at each end integral aligning flanges extending rearward so as to partly enclose and align the spring strip attaching members which may be adjustably or otherwise clamped or connected to this central connecting device or buffer front plate. Such vertically extending front plates or clamping connecting devices may be advantageously formed of spring steel strip or sheet metal $\frac{3}{16}$ to $\frac{3}{8}$ of an inch thick more or less and having, if desired, vertically separated contact portions one of which may in some cases be substantially in line with the buffer front strips, one or more of which may extend more or less across the buffer front behind or adjacent the cooperating contact clamping member. These different front contact portions which may be provided on one or both edges with stiffening flanges to give increased stiffness especially adjacent the central part of the member may be separated from each other vertically to the desired extent so as to secure a front collision face which may be substantially flat, if desired, and which may have a vertical width of six or eight inches or more in some cases. The ends of the front plate may be formed with substantially parallel flanged edges extending inward several inches so as to partly enclose and align the cooperating inturned ends of the attaching members which may, if desired, have bifurcated diverging inner ends adapted to cooperate with the adjacent diverging flanges of the front plate so as to prevent the inturned end of the attaching member working outward to an undesirable extent even if the bolts or other tightening devices on the clamping members become loose. These clamping members may advantageously comprise a wide clamping device or clip enclosing the cooperating parts adjacent each end of the front plate and also a clamping bolt which may pass through the front plate inside the clip and extend through the slot formed in the bifurcated end of the attaching member so as to allow the desired longitudinal adjustment of the parts while securely clamping them in their final adjusted position.

In the accompanying drawing showing in a somewhat diagrammatic way an illustrative embodiment of the invention:

Figure 1:
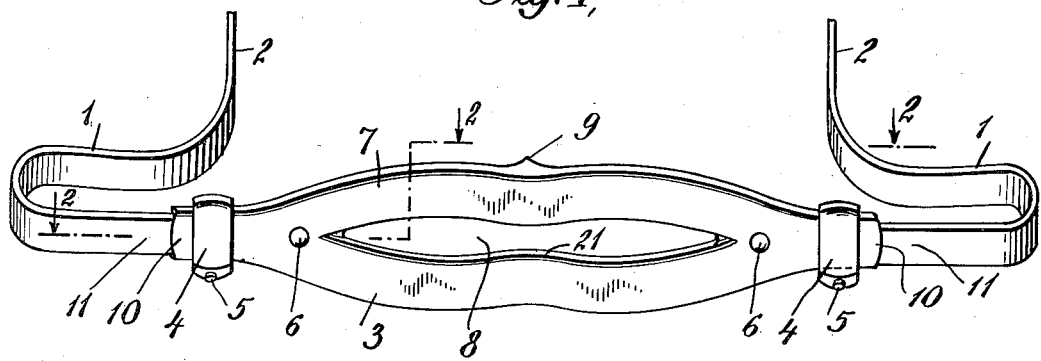
Fig. 1 is a front perspective view.
Figure 3:
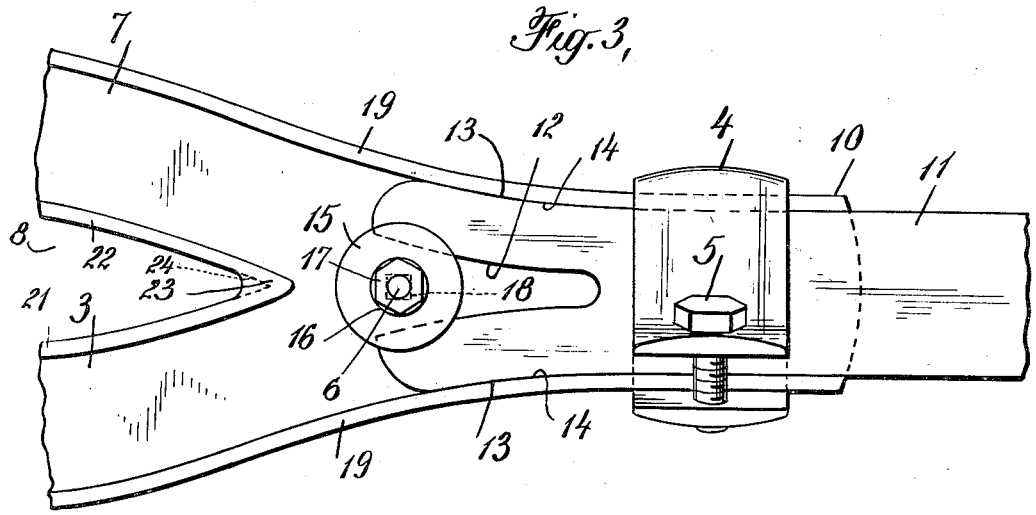
Fig. 3 is an enlarged rear view taken along the line 3—3 of Fig. 2.

The automobile buffer may have any desired or suitable construction and preferably comprises one or more pieces of spring steel strip which at the buffer front may in some cases be arranged in overlapping or reenforcing position although in most cases it is more desirable to have the inturned ends of these front strips extend toward and in line with each other without substantial overlapping. As is indicated in Fig. 1 a modified Lyon type spring buffer is shown comprising the attaching arms or members 2 of any suitable shape and construction which may each have an integral end loop 1 and an inturned connector portion 11. This spring steel strip which may, of course, be hardened and tempered after it is shaped and bent into the desired form may have a slotted or bifurcated inner end comprising, as shown in Fig. 3, the slot 12 so that the outwardly flaring edges 13 of this connector end may, if desired, have substantially the same angle of divergence as the inner edges 14 of the diverging stiffening edge flanges 19 of the cooperating front plate 3.

Figure 2:
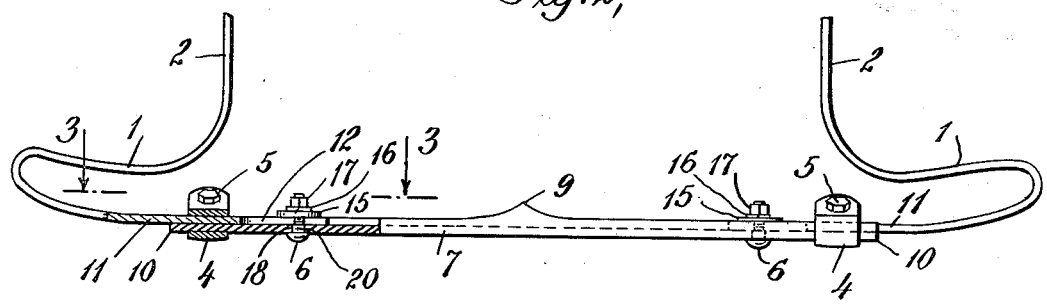
Fig. 2 is a top view, parts being shown in section along the line 2—2 of Fig. 1.

This buffer front plate may be advantageously formed of a single piece of spring steel plate about a quarter of an inch thick more or less which may be blanked out and then forged or bent in dies or otherwise so that the parts are given the desired form before the hardening and tempering of the plate which is usually advantageous with this construction. In this way the front plate or connecting contact member may be formed with several contact faces such as 3, 7 which may have suitable stiffening or strengthening flanges such as 9, 12 extending more or less along the upper and lower edges of the plate while upper and lower mid-flanges 21, 22 may also be formed along the edges of the central opening 8 which may be given the substantially double diamond or double lenticular form indicated in Fig. 1, if desired. The longitudinal and rearward extent and location of these stiffening flanges of course depends considerably on the length and thickness of the front plate which may be given a total length sufficient to extend somewhat past the attaching members of the buffer while the vertical width of this contact connecting member may be 6 or 8 inches or more, if desired. Under these conditions the upper top flange may extend entirely across this front plate and may adjacent the centre of the plate be given an increased rearward extension, the flange gradually extending back to increasing distances so as to form the flange point or angle as indicated in Figs. 1 and 2 which also gives the buffer a pleasing and unique appearance harmonizing with its curved front face. It is quite desirable to force or forge down a somewhat thicker or wider connecting portion 23 joining the two mid-flanges 21 and 22 at the ends of the central opening 8 as is shown in Fig. 3 and this thickened portion may to some extent at least bridge across the angular end 24 of this opening which can thus be carried out more sharply on the front face of the buffer.

It is usually desirable to have the inturned ends of the attaching members adjustably connected to the ends of the buffer front plate and for this purpose it is desirable to have the front plate formed at its ends 10 with substantially parallel aligning flanges which may project rearward to an extent substantially equal to the thickness of the inturned ends or connector portions 11 of the attaching members. By using an enclosing clamping device such as the forged steel clip 4 substantially enclosing these parts and having its angularly extending ends forced together by the tightening bolt 5 so as to force the adjacent part of the clamping device against the rear face of the connector portion 11, these two parts may be tightly held in adjusted position although in many cases it is desirable to have an inner clamping or connecting device in connection with such a clip. For this purpose a clamping bolt having a square or other noncircular shank 20 fitting within a corresponding hole 18 in the front plate may have a rounded boss or head 6 on the front side of the plate while its threaded end may cooperate with a tightening nut 17 and with a lock washer 16, if desired, so as to force the heavy washer 15 into tight holding engagement with the end of the connector portion 11 which may be formed with a central slot 12, if desired. It is usually advantageous to have this slot flaring inwardly especially where the tightening bolt 6 is located adjacent the junction portion 23 of the mid-flanges so that when the connector portion of the attaching member is in its inwardly adjusted position the diverging ends of the strip on each side of this slot may pass on either side inwardly beyond the flange end so as to considerably promote the range of adjustment provided. This also provides diverging outer edges 13 on this inner connector portion which when drawn out into its outer adjusted position shown in Fig. 3 are adapted to engage the inner faces 14 of the edge flanges of the front plate so that further outward movement of the attaching member is positively prevented and the connection thus made correspondingly more secure.

This invention has been described in connection with a number of embodiments, forms, proportions, parts, arrangements, materials, methods of connection and use, to the details of which disclosure the invention is not of course to be limited since what is claimed as new and what is desired to be secured by Letters Patent is set forth in the appended claims:

1. The automobile buffer comprising end loop attaching members of spring steel strip having rearwardly extending attaching portions adapted to be secured to the automobile frame members and having bifurcated flaring inturned connector portions, a cooperating tempered spring steel front plate having end connector portions formed with substantially parallel edge aligning flanges and having a central opening provided with mid-flanges extending adjacent said connector portions, a clamping bolt having a non-circular shank extending through each of said connector portions of the front plate adjacent the ends of the central opening therein and having a threaded end adapted to extend between the bifurcated ends of the connector portion of the attaching member to clamp the same to said front plate and enclosing clamping devices adapted to be bolted around the cooperating connector portions of said front plate and attaching members adjacent the ends of said front plate.

2. The automobile buffer comprising end loop attaching members of spring steel strip adapted to be secured to the automobile frame members and having bifurcated inturned connector portions, a cooperating tempered spring steel front plate having end connector portions formed with substantially parallel edge aligning flanges and having a central opening provided with mid-flanges extending adjacent said connector portions, a clamping bolt extending through each of said connector portions of the front plate adjacent the ends of the central opening therein and having a threaded end adapted to extend between the bifurcated ends of the connector portion of the attaching member to clamp the same to said front plate and enclosing clamping devices around the cooperating connector portions of said front plate and attaching members adjacent the ends of said front plate.

3. The automobile buffer comprising end loop attaching members of spring steel adapted to be secured to the automobile frame members and having bifurcated inturned connector portions, a cooperating spring steel front plate having stiffening flanges adjacent its central portion and end connector portions formed with substantially parallel edge aligning members and having a central opening provided with mid-flanges extending adjacent said connector portions, a clamping bolt extending through each of said connector portions of the front plate adjacent the ends of the central opening therein and adapted to extend between the bifurcated end portions of the attaching member to clamp the same to said front plate and clamping devices adapted to adjustably secure together the cooperating connector portions of said front plate and attaching members adjacent the ends of said front plate.

4. The automobile buffer comprising end loop attaching members of spring steel strip adapted to be secured to the automobile frame members and having bifurcated inturned connector portions, a cooperating spring steel front plate having end connector portions formed with substantially parallel edge aligning members and having a central opening extending adjacent said connector portions, a clamping bolt extending through each of said connector portions of the front plate adjacent the ends of the central opening therein to clamp the attaching member to said front plate and clamping devices adapted to adjustably secure together the cooperating connector portions of said front plate and attaching members adjacent the ends of said front plate.

5. The automobile buffer comprising end loop attaching members of spring strip adapted to be secured to the automobile frame members and having inturned connector portions, a cooperating front plate having end connector portions formed with substantially parallel edge aligning members, a clamping bolt extending through each of said connector portions of the front plate and adapted to clamp the connector portion of the attaching member to said front plate and enclosing clamping devices adapted to be secured around the cooperating connector portions of said front plate and attaching members outside of said clamping bolts and adjacent the ends of said front plate.

6. The automobile buffer comprising end loop attaching members of steel strip adapted to be secured to the automobile frame members and having inturned connector portions, a cooperating front plate having end connector portions, a clamping bolt extending through each of said connector portions of the front plate and adapted to clamp the connector portion of the attaching member to said front plate and enclosing clamping devices adapted to be secured around the cooperating connector portions of said front plate and attaching members.

7. The automobile buffer comprising end loop attaching members adapted to be secured to the automobile frame members and having bifurcated inturned connector portions, a cooperating spring steel front plate having end connector portions formed with substantially parallel edge aligning flanges extending rearwardly therefrom about as far as the thickness of the cooperating attaching member ends and having a central opening provided with mid-flanges extending adjacent said connector portions, a clamping bolt extending through each of said connector portions of the front plate and adapted to extend between the bifurcated connector portion of the attaching member to clamp the same to said front plate in laterally adjusted position and enclosing clamping devices adapted to be secured around the cooperating connector portions of said front plate and attaching members adjacent the ends of said front plate.

8. The automobile buffer comprising end loop attaching members adapted to be secured to the automobile frame members and having inturned connector portions, a cooperating spring steel front plate having end connector portions formed with substantially parallel edge aligning flanges extending rearwardly therefrom about as far as the thickness of the cooperating attaching member ends and having a central opening, a clamping device cooperating with each of said connector portions of the front plate and adapted to cooperate with the connector portion of the attaching member to clamp the same to said front plate in laterally adjusted position and enclosing clamping devices adapted to be secured around the cooperating connector portions of said front plate and attaching members adjacent the ends of said front plate.

9. The automobile buffer comprising end loop attaching members of spring steel strip having bifurcated flaring inturned connector portions, a cooperating spring steel front plate having end connector portions formed with substantially parallel edge aligning flanges adapted to cooperate with the flaring inturned ends of said attaching members to prevent undesirable outward movement thereof and having a central opening provided with mid-flanges extending adjacent said connector portions, a clamping bolt extending through each of said connector portions of the front plate adjacent the ends of the central opening therein and extending between the bifurcated connector portion of the attaching member to clamp a holding washer thereon, and enclosing clamping devices adapted to be bolted around the cooperating connector portions of said front plate and attaching members adjacent the ends of said front plate.

10. The automobile buffer comprising end loop attaching members of spring steel strip having bifurcated flaring inturned connector portions, a cooperating spring steel front plate having end connector portions formed with substantially parallel edge aligning flanges adapted to cooperate with the flaring inturned ends of said attaching members to prevent undesirable outward movement thereof, and enclosing clamping devices adapted to be bolted around the cooperating connector portions of said front plate and attaching members adjacent the ends of said front plate.

11. The one piece spring steel buffer contact and connecting plate adapted for use with spring strip automobile buffer members and comprising vertically separated contact faces adjacent its middle portion and comprising rearwardly bent edge stiffening flanges, the upper flange of which has gradually increasing rearward extent adjacent the middle portion of the plate, and comprising rearwardly extending mid-flanges extending around the central opening in said plate and having adjacent the ends of the opening an increased width junction flange on the rear of the plate bridging over the front portion of the end of the opening, the ends of said plate comprising connector portions extending outward beyond the central opening and having substantially parallel aligning flanges extending inward a considerable distance from the plate ends to promote the alignment of the cooperating strip attaching members.

12. The one piece spring steel buffer contact and connecting plate adapted for use with spring strip automobile buffer members and comprising vertically separated contact faces adjacent its middle portion and comprising rearwardly bent edge stiffening flanges having gradually increasing rearward extent adjacent the middle portion of the plate, the ends of said plate comprising connector portions extending outward beyond the central opening and having substantially parallel aligning flanges extending inward a considerable distance from the plate ends to promote the alignment of the cooperating strip attaching members.

13. The one piece spring steel buffer contact and connecting plate adapted for use with spring strip automobile buffer members and comprising vertically separated contact faces adjacent its middle portion and comprising rearwardly extending edge stiffening flanges, and comprising rearwardly extending mid-flanges extending around the central opening in said plate and having adjacent the ends of the opening an increased width connecting flange on the rear of the plate bridging over the front portion of the end of the opening, the ends of said plate comprising connector portions extending outward beyond the central opening and having edge aligning devices to promote the alignment of the cooperating strip attaching members.

14. The one piece spring steel buffer contact and connecting plate adapted for use with spring strip automobile buffer members and comprising vertically separated contact faces adjacent its middle portion and comprising rearwardly extending mid-flanges extending around the central opening in said plate and having adjacent the ends of the opening an increased width connecting flange on the rear of the plate bridging over the front portion of the end of the opening, the ends of said plate comprising connector portions extending outward beyond the central opening.

15. The one piece spring steel buffer contact and connecting plate adapted for use with spring strip automobile buffer members and comprising a substantially double lenticular opening and adjacent vertically separated contact faces near its middle portion and comprising rearwardly extending edge stiffening flanges, the upper flange of which has gradually increasing width adjacent the middle portion of the plate and rearwardly extending mid-flanges extending around the central opening in said plate, the ends of said plate comprising connector portions extending outward beyond the central opening.

16. The one piece spring steel buffer contact and connecting plate adapted for use with spring strip automobile buffer members and comprising an opening and adjacent vertically separated contact faces near its middle portion and comprising rearwardly extending edge stiffening flanges, the upper flange of which has gradually increasing width adjacent the middle portion of the plate and rearwardly extending mid-flanges adjacent the central opening in said plate, the ends of said plate comprising connector portions extending outward beyond the central opening.

GEORGE ALBERT LYON.